US012729490B2

(12) United States Patent
Avans et al.

(10) Patent No.: US 12,729,490 B2
(45) Date of Patent: Sep. 8, 2026

(54) SYSTEM AND METHOD FOR AUTOMATICALLY GUIDING A ROAD CONSTRUCTION MACHINE

(71) Applicant: Roadtec, Inc., Chattanooga, TN (US)

(72) Inventors: Christopher Todd Avans, Sale Creek, TN (US); Ramon Pujol Guim, Chattanooga, TN (US)

(73) Assignee: Roadtec, Inc., Chattanooga, TN (US)

( * ) Notice: Subject to any disclaimer, the term of this patent is extended or adjusted under 35 U.S.C. 154(b) by 745 days.

(21) Appl. No.: 18/157,600

(22) Filed: Jan. 20, 2023

(65) Prior Publication Data

US 2024/0052583 A1 Feb. 15, 2024

Related U.S. Application Data

(60) Provisional application No. 63/397,420, filed on Aug. 12, 2022.

(51) Int. Cl.
*E01C 23/07* (2006.01)
*E01C 19/00* (2006.01)
(Continued)

(52) U.S. Cl.
CPC ............ *E01C 19/006* (2013.01); *E01C 23/02* (2013.01); *E01C 23/07* (2013.01); *E01C 23/088* (2013.01);
(Continued)

(58) Field of Classification Search
CPC .... E01C 19/006; E01C 2201/08; E01C 23/02; E01C 23/07; G05D 1/219; G05D 1/248; G01S 7/4817
(Continued)

(56) References Cited

U.S. PATENT DOCUMENTS 6,371,566 B1 4/2002 Haehn
6,799,922 B2 10/2004 Smith
(Continued)

FOREIGN PATENT DOCUMENTS

AU 2023208196 A1 * 2/2024 ............. E01C 19/00
CA 3207671 A1 * 2/2024 ............. G05D 1/246
(Continued)

OTHER PUBLICATIONS

Edward Johnson, Laser Guided Screed Machine, (Year: 2019).*
(Continued)

*Primary Examiner* — Cuong H Nguyen
(74) *Attorney, Agent, or Firm* — Chambliss, Bahner & Stophel, P.C.; Stephen D. Adams

(57) ABSTRACT

A method and system for guiding a road construction machine using a machine guidance system comprising at least one each of a machine position sensor, a laser-based sensor, and a processing unit. The machine position sensor first measures a position of a road construction machine relative to a road boundary condition. The laser-based sensor then captures a series of scans corresponding to the boundary condition. The processing unit, using the scans, determines an ideal path of travel for the road construction machine. Based on the ideal travel path, the machine guidance system provides instructions to align the current travel path of the road construction machine to the ideal travel path.

20 Claims, 6 Drawing Sheets

(51) Int. Cl.
*E01C 23/02* (2006.01)
*E01C 23/088* (2006.01)
*E01C 23/12* (2006.01)
*G05D 1/248* (2024.01)
*G05D 3/20* (2006.01)

(52) U.S. Cl.
CPC ........ *E01C 23/127* (2013.01); *E01C 2201/08* (2013.01); *G05D 1/248* (2024.01); *G05D 3/20* (2013.01)

(58) Field of Classification Search
USPC ............................................................ 701/50
See application file for complete search history.

(56) References Cited

U.S. PATENT DOCUMENTS

| | | | |
|---|---|---|---|
| 7,399,139 | B2 | 7/2008 | Kieranen et al. |
| 10,007,270 | B2 † | 6/2018 | Mazur et al. |
| 10,480,939 | B2 | 11/2019 | Annovi et al. |
| 10,633,803 | B2 * | 4/2020 | Højland .............. E01C 19/4873 |
| 10,829,898 | B2 | 11/2020 | Morrison |
| 11,725,348 | B2 * | 8/2023 | Nelson ................. G05D 1/0251 701/28 |
| 11,834,797 | B2 * | 12/2023 | Nelson .................... E01C 23/01 |
| 2006/0198700 | A1 † | 9/2006 | Maier et al. |
| 2016/0060820 | A1 | 3/2016 | Berning et al. |
| 2018/0023260 | A1 | 1/2018 | Muir et al. |
| 2018/0106014 | A1 | 4/2018 | Horstman et al. |
| 2019/0332082 | A1 | 10/2019 | Wright et al. |
| 2021/0010210 | A1 * | 1/2021 | Ellwein ................... E01C 19/48 |
| 2021/0247514 | A1 * | 8/2021 | Horn ....................... E01C 19/48 |
| 2021/0310202 | A1 | 10/2021 | Doy et al. |
| 2021/0317620 | A1 | 10/2021 | Buschmann et al. |
| 2021/0388564 | A1 | 12/2021 | Hirman et al. |
| 2022/0259827 | A1 | 8/2022 | Argenziano et al. |
| 2022/0290383 | A1 * | 9/2022 | Buschmann ......... G01B 11/245 |
| 2024/0052583 | A1 * | 2/2024 | Avans ................... E01C 19/006 |

FOREIGN PATENT DOCUMENTS

| | | | | | |
|---|---|---|---|---|---|
| CN | 107314768 | B | * | 6/2020 | ............. G01C 21/16 |
| CN | 111845709 | A | * | 10/2020 | .......... B60W 40/064 |
| CN | 113260876 | A | * | 8/2021 | ............. G01S 17/42 |
| DE | 9313075 | U1 | | 12/1993 | |
| DE | 19951296 | C2 | † | 10/1999 | |
| DE | 19951297 | C1 | † | 10/1999 | |
| EP | 1118713 | A1 | † | 1/2000 | |
| EP | 3524731 | B1 | * | 1/2021 | ........... E01C 19/008 |
| EP | 4056758 | A1 | * | 9/2022 | ........... E01C 23/088 |
| JP | 6386794 | B2 | * | 9/2018 | ........... G01S 17/931 |
| KR | 102247300 | B1 | * | 5/2021 | ............. G01C 21/32 |
| WO | WO-2020088782 | A1 | * | 5/2020 | ........... G01S 7/4802 |

OTHER PUBLICATIONS

Wang, Yuchen, et al. "Automatic extraction and evaluation of pavement three-dimensional surface texture using laser scanning technology." Automation in construction 141: 104410. (Year: 2022).*

De Soto, Borja Garcia, and Miroslaw J. Skibniewski. "Future of robotics and automation in construction." Construction 4.0. Routledge, 2020. 289-306.*

Loizou, L., Barati, K., Shen, X., & Li, B. Quantifying advantages of modular construction: Waste generation. Buildings, 11(12), 622. ( Year: 2021).*

Non-Final Office Action for U.S. continuation-in-part U.S. Appl. No. 18/962,611, dated Jun. 2, 2026, 8 pages.

* cited by examiner
† cited by third party

SYSTEM AND METHOD FOR AUTOMATICALLY GUIDING A ROAD CONSTRUCTION MACHINE

FIELD

The present invention relates generally to a guidance system for a road construction machine, and more particularly, a guidance system for automatically guiding the machine along a computer-generated desired path that is based on scans of pre-existing reference points located at the road-building site.

BACKGROUND

During the construction of a road, a variety of road construction machines are utilized to carry out different processes in the road-building process. In carrying out many of those processes, the road construction machine must often and ideally travel relative to a fixed position of a road-building site. For example, in FIG. 1, a typical road-building site 100 is shown, which includes a partially-completed road surface comprised of a paved portion 102A with a freshly-painted line 104 and an unpaved portion 102B having an old painted line 106, which abut one another along a longitudinal joint or seam 108 between the paved portion 102A and unpaved portion 102B. When constructing a road surface, multiple road construction machines 110, sometimes called a "paving train" travel along the road-building site in a certain order and along a specific path, such as along the seam 108, in order to obtain a finished road surface that has the desired characteristics and features (e.g., smoothness, crowning, straight and accurate lines, etc.). The paving train of construction machines 110 might include, for example, a plurality of asphalt material supply trucks to provide a fresh supply of ready paving mix to the road-building site 100, a paving machine to receive paving mix from the supply trucks and to deposit the paving mix to form the new road surface over the unpaved portion 102B, and then a compactor for compacting and smoothing the newly-paved road surface. In some cases, a material transfer machine may be used to shuttle paving mix from the supply trucks to the paving machine so as to avoid possibly interrupting the paving process. During this process, certain machines of the paving train 110 might travel together along the paved portion 102A, such as the supply trucks and material transfer machine, while other machines of the paving train 110 travel along the unpaved portion 102B, such as the paving machine and compactor. Once the road surface is completed, a paint truck then generally travels along the new road surface and paints longitudinal center lines, lane lines, and edge lines to demarcate the various sections of the road.

In carrying out various steps of the road-building process, it is often important to do so carefully and accurately and along a specific path, such as along the seam 108. This would include, for example, the step of depositing the paving mix onto the unpaved portion 102B of the road-building site 100. In carrying out this process, paving mix should be deposited and formed in such a way that one paved section is placed adjacent and abuts the next paved section along the seam 108. Thus, in that case, the seam 108 can form a reference point or a fixed portion of the road surface that the paving machine must follow in order to obtain optimal results. If the paving machine fails to accurately travel along the seam 108, bumps or gaps may be created in the road surface, which would require rework and correction. Thus, having the ability to accurately guide a road-working machine along a desired pathway is important for an efficient and successful paving process.

Certain current methods for guiding a road construction machine along a desired path depend on the visual observation of an operator. One such method involves attaching a vertically-oriented or hanging chain to a portion of the road-building machine or from a portion of a strut extending from the machine. This chain is used as a visual guide for maintaining the road construction machine at a fixed distance away from a point of reference (e.g., seam 108). Generally, the chain is suspended vertically above the seam 108. As the road construction machine travels along the travel path, one person watches the chain to ensure that it remains vertically over the seam 108. That person then provides instructions to a machine operator to assist the operator in correcting the position of the road construction machine in order to maintain that desired position relative to the fixed portion of the road-building site 100 (e.g., maintaining the chain directly above the seam 108). Although this method can yield positive results, it is very labor intensive and requires the use of highly skilled operators and drivers. It also requires continual visual observation of the chain, which can make the use of this method labor and attention intensive (i.e., demanding operator attention over long periods of time). It can also be difficult at night or in otherwise darkened conditions (e.g., under an overpass or through a tunnel), which is when many road-building processes take place. Additionally, this method is very slow and dangerous, as it requires an operator to walk alongside the road construction machine.

An alternative method used to guide road construction machines along a desired path uses a camera system to identify and observe a fixed area of the road-building site 100. That observed area is then displayed to an operator via a display on the road construction machine (or elsewhere) and the operator must correct the position of the road construction machine or provide instructions for correcting the travel path of the road construction machine. While this method addresses the safety issue caused by placing personnel alongside the road construction machine, the process of continually monitoring the display while operating the machine can be very difficult and introduce new dangers. Additionally, as with the previously mentioned method, the accuracy of this method (i.e., the ability to guide the road construction machine along the ideal path) is limited by a number of human factors, including the visual capability of the human eye and the operator's hand-eye coordination.

Other systems used in connection specifically with paving machines utilize cameras to track reference points, such as the seam 108 between adjacent paved and unpaved portions 102A, 102B, in order to automate the positioning of a screed side plate of the paving machine, which impacts the width of the area that is paved by the paving machine. However, these systems still require the operator to operate (e.g., steer) the paving machine, which is a source for potential error and can limit the effectiveness of the camera tracking system. For example, even with automatic adjustment of the screed side plate, the road could be paved incorrectly if the paving machine, itself, is not correctly located. Additionally, this camera-based technology is limited to paving machines only and is not useful for other road construction machines, especially those machines that do not rely on seams 108 between paved and unpaved sections, 102A, 102B, to be correctly located at the road-building site 100, such as paint trucks.

In certain cases, for certain road construction machines, a seam 108 might not be available to guide the progress of the machine along the road-building site 100. This might be the case, for example, when forming the first paved section at a road-building site or when painting lines on a completed road. In those cases, alternative points of reference might be required. This might include, for example, the placement of a string line or the use of other repeating stationary reference points that are used to correctly position the road construction machine at the road-building site 100. However, placing these reference points can be time consuming and impractical. For example, a string line is useful for straight sections of road but not for curved road section. Attempts have also been made to use aspects of the road-building site itself, such as an edge of a road or a divider, to function as a suitable reference point. However, these site-based reference points are often inconsistent or too transitory to consistently function as a suitable reference point.

What is needed, therefore, is an accurate and safe system and method for guiding a variety of road construction machines along a desired travel path at a road-building site that increases the speed of the road construction machine, is usable at night, is usable for a variety of site conditions, including when only sporadic or inconsistent reference points are available, and that decreases the skill required by the driver or operator of the road construction machine.

Attempts to address the above and other needs are made by the presently-disclosed system and method for guiding a road construction machine along a desired travel path at a road-building site, wherein the travel path is determined by utilizing scans of a longitudinal boundary condition of the road surface and calculating a line best-representing a series of critical points within the scans.

In order to facilitate an understanding of the invention, certain preferred implementations of the invention are illustrated in the drawings, and a detailed description thereof follows. It is not intended, however, that the invention be limited to the particular implementations described or to use in connection with the implementations illustrated herein. Therefore, the scope of the invention contemplated by the inventor includes all equivalents of the subject matter described and claimed herein, as well as various modifications and alternative implementations such as would ordinarily occur to one skilled in the art to which the invention relates. The inventor expects skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

Notes on Construction

The use of the terms "a", "an", "the" and similar terms in the context of describing implementations of the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the implementations of the invention described herein is not intended to limit such characteristic to the absolute value which the term modifies, but rather to provide an approximation of the value of such physical or functional characteristic.

Terms concerning attachments, coupling and the like, such as "attached", "connected" and "interconnected", refer to a relationship wherein structures are secured or attached to one another either directly or indirectly through intervening structures, as well as both moveable and rigid attachments or relationships, unless otherwise specified herein or clearly indicated as having a different relationship by context. The terms "operatively attached" and "operatively connected" describe such an attachment, coupling or connection that allows the pertinent structures to operate as intended by virtue of that relationship.

The use of any and all examples or exemplary language (e.g., "such as" and "preferably") herein is intended merely to better illuminate the implementations of the invention described herein, and not to place a limitation on the scope of the invention. Nothing in the specification should be construed as indicating any element as essential to the practice of the invention or of the implementations of the invention described herein unless so stated with specificity.

Several terms are specifically defined herein. These terms are to be given their broadest reasonable construction consistent with such definitions, as follows:

The term "road construction machine" refers to a general class of machines utilized in the construction of roads. Examples of road construction machines are given in the description below.

SUMMARY

The above and other problems may be addressed by a method for guiding a road construction machine along a desired travel path at a road-building site. According to one embodiment, a road construction vehicle is provided along with a machine guidance system (MGS). The MGS preferably includes one or more machine positions sensors, one or more laser-based sensors, and one or more processing units. The machine position sensors determine a current position of the road construction machine. The one or more laser-based sensors capture a plurality of scans of a longitudinal boundary condition of the road surface along a longitudinal extent of the road surface. The plurality of scans are provided to the one or more processing units. The one or more processing units identifies at least one critical point in each of the scans that is estimated to correlate with a location of a reference point of the road surface. The one or more processing units then generate a digital desired travel path of the road construction machine based on the critical points. In certain cases, the processing units filter out at least one critical point when generating the digital desired travel path. The one or more processing units then provide instructions for aligning the current positon of the road construction machine with the desired travel path of the road construction machine. In certain cases, the digital desired travel path and the instructions are updated in real-time as the road construction machine travels along the road surface.

In some cases, the reference points are discontinuous along the longitudinal extent of the road surface such that a discontinuity exists. The discontinuity is between the critical point of at least a first one of the plurality of scans and the critical point of a second one of the plurality of scans that is immediately adjacent the first one of the plurality of scans.

In certain embodiments, the one or more processing units include two or more selectable preprogrammed edge profiles. Each preprogrammed edge profile corresponds to a different type of road-building site and includes a set of instructions for processing the plurality of scans of the road surface to identify critical points associated with the corresponding type of road-building site. In these embodiments, the method further comprises the step of selecting one preprogrammed edge profile and identifying the critical points based on the selected edge profile. In certain embodiments, an initial scan of the road surface is performed with the one or more laser-based sensors. Based on the initial scan, the MGS automatically selects one of the two or more selectable preprogrammed edge profiles. In some cases, the preprogrammed edge profiles of the MGS utilize artificial intelligence in identifying the critical points, generating a digital desired travel path based on the critical points identified, determining a current position of the road construction machine, or providing instructions for aligning the current position with the desired travel path.

In some cases, a first sub-set of the one or more laser-based sensors capture a first plurality of scans of the road surface along a longitudinal extent of the road surface along a first lateral side of the road construction machine. A second sub-set of the one or more laser-based sensors captures a second plurality of scans along a longitudinal extent of the road surface along a second lateral side of the road construction machine. The one or more processing units subsequently identify a first critical point for each of the first plurality of scans using the one. The one or more processing units then identify a second critical point for each of the second plurality of processing units then generate a digital desired travel path based on the first and second critical points identified. In some cases, the first sub-set of the one or more laser-based sensors and the second sub-set of the one or more laser-based sensors are both disposed on the first lateral side of the road construction machine. In certain cases, each of the second critical points is different from each of the first critical points.

The present disclosure also provides a machine guidance system (MGS) configured to provide instructions for aligning a current position of a road construction machine with a desired travel path at a road-building site in order to guide the road construction machine along the desired travel path. The MGS preferably comprises one or more machine position sensors, one or more laser-based sensors, and one or more processing units. Preferably, the machine position sensors determine a current position of the road construction machine. The one or more laser based sensors preferably capture a plurality of scans of a longitudinal boundary condition of a road surface long a longitudinal extent of the road surface. The one or more processing units preferably identify at least one critical point in each of the scans that is estimated to correlate with a location of a reference point of the road surface. The one or more processing units further generates a digital desired travel path of the road construction machine based on the critical points and provides instructions for aligning a current position of the road construction machine with the desired travel path of the road construction machine. In some cases, the machine positions sensors may determine at least one of a current heading and current speed of the road construction machines. In other cases, the one or more processing units generate a line that is fitted to the critical points identified. Further, the desired travel path is generated based on the line; the desired travel path and the instructions for aligning the current positon of the road construction machine with the desired travel path are based on at least one parameter related to the road construction machine. In some cases, the one or more processing units may be configured to generate the line by fitting a curve best approximating the critical points for the plurality of scans. In some cases, the at least one parameter may be a geometry of the road construction machine or a component or portion thereof, a current speed of the road construction machine, or the current heading of the road construction machine.

In some cases, the one or more processing units automatically executes the instructions so as to automatically align the road construction machine with the desired travel path, including by automatically steering the road construction machine.

In certain cases the one or more processing units of the MGS include two or more selectable preprogrammed edge profiles. Each preprogrammed edge profile corresponds to a different type of road-building site and includes a set of instructions for processing the plurality of scans of the road surface to identify critical points associated with the corresponding type of road-building site. In some cases, the MGS automatically selects one of the two or more selectable preprogrammed edge profiles in response to an initial scan of the road surface.

In some cases, the processing unit is configured to generate a representative model of the road surface that includes a desired path for performing a desired machine function relative to the road surface. Upon generation of the representative model, the at least one processing unit provides instructions for positioning the road construction machine such that the desired machine function may be performed along the desired path.

In some cases, the machine guidance system includes a controller. The controller receives the instructions for aligning the current position of the road construction machine with the desired travel path of the road construction machine. The controller further automatically adjusts the position of the road construction machine, including at least a steering control, such that the road construction machine travels along the desired travel path. In some cases, the MGS is disposed exclusively on the road construction machine.

BRIEF DESCRIPTION OF THE DRAWINGS

Further advantages of the invention are apparent by reference to the detailed description when considered in conjunction with the figures, which are not to scale so as to more clearly show the details, wherein like reference numerals represent like elements throughout the several views, and wherein.

DETAILED DESCRIPTION OF THE INVENTION

Figure 2:
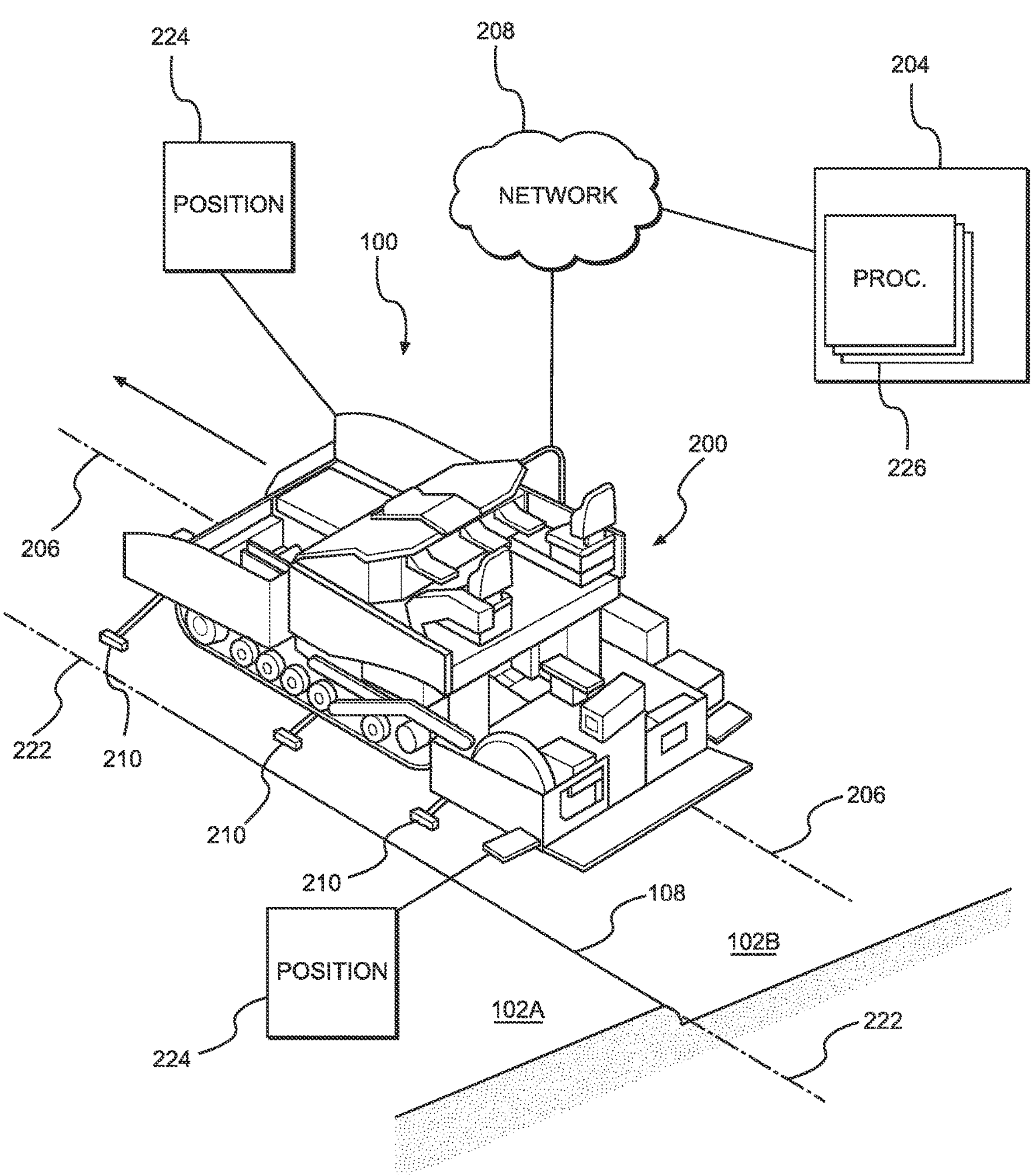
FIG. 2 is an isometric view of a road construction machine equipped with laser-based sensors of a machine guidance system (MGS) that may be used for guiding the road construction machine along a desired travel path at a road-building site, such as the road-building site shown in FIG. 1, according to an implementation of the present invention.

With reference now to FIG. 2, a road construction machine 200 that may be guided along a desired travel path 206 at a road-building site 100 according to implementations of the present invention is shown. The machine 200 is preferably guided (e.g., steered) automatically by a machine guidance system (or "MGS") 204 along the desired travel path 206, which essentially functions as a "flight plan" for the machine. Machine 200 may be in direct communication with the MGS 204, which may be located partially or exclusively on the machine, or may communicate with the MGS (or a portion thereof) over a wireless network 208. While the road construction machine 200 is depicted in FIG. 2 as a paving machine, it should be understood that the system and method disclosed herein may be used to guide a variety of road construction machines that each carry out unique tasks at the road-building site 100. As non-limiting examples, the machine 200 could be a paver, a road mill, a cold planer, an asphalt broom, a haul truck, a dump truck, a material transfer machine, a soil stabilizer, a soil reclaimer, a compactor, a paint truck, or other similar machines.

As shown, the machine 200 is equipped with a plurality of sensors 210 (e.g., lasers or other similar light scanning devices). In this particular illustration, sensors 210 are shown on only one lateral side of machine 200. However, in other cases, sensors 210 may be located in any convenient location on or around the machine 200. As the machine 200 travels in travel direction F along a longitudinal extent of site 100, sensors 210 capture and record multiple images or scans of the road-building site 100, which are preferably 3-D scans of the road-building site 100. These scans may be captured using continuous or variable surface scan rates. The scans are then combined together to form one or more combined 3-D scans of the longitudinal boundary condition (s) at the road-building site 100, which then functions as a representative model of the road-building site.

Figure 1:
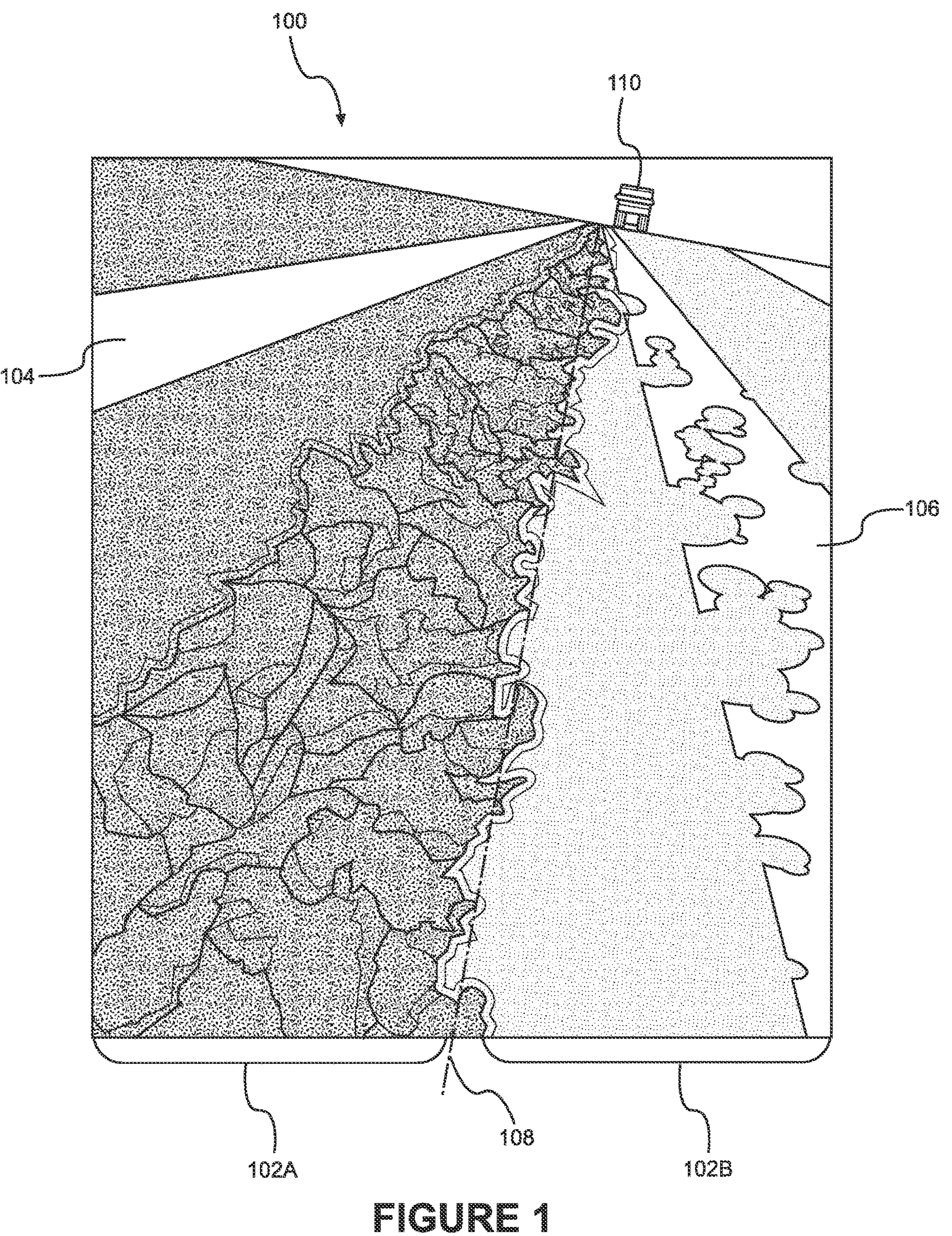
FIG. 1 depicts a conventional road-building site having a paved portion abutting an unpaved portion along a longitudinal joint or seam.
Figure 3:
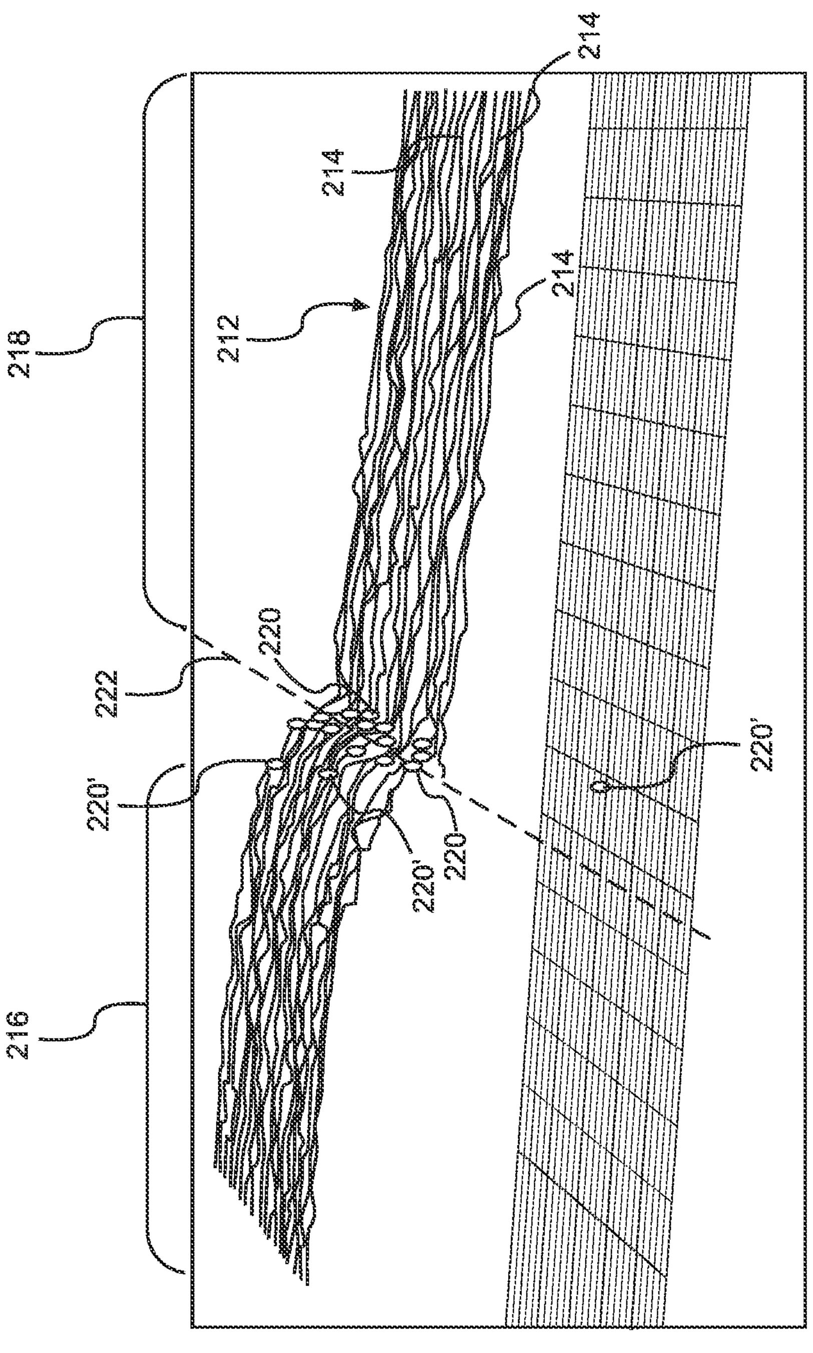
FIG. 3 is a representative 3-D model of a road-building site formed by a plurality of scans captured using laser-based sensors of a machine guidance system that replicates the road-building site shown in FIG. 1 and that may be used for guiding the road construction machine along a desired travel path at a road-building site.

Now, shown in FIG. 3 is a representative model 212 of a portion of the longitudinal boundary condition of a road-building site 100 shown in FIG. 1. This model 212 is formed from a plurality of individual scans, which are represented here within the model 212 by three-dimensional scan lines 214, and which are captured by sensors 210 of the presently-disclosed system as noted above. As shown, the model 212 includes a first portion 216 that corresponds to the paved portion 102A of the road-building site 100 and a second portion 218 that corresponds to the unpaved portion 102B of the road-building site 100. As noted previously, the position of the seam 108 between the paved portion 102A and the unpaved portion 102B may be used as a reference line for guiding a road construction machine 200. The portion of the model 212 that corresponds with a real-life reference point, such as the seam 108, are referred to herein as critical points 220.

The critical points 220 preferably identify certain features or elements that repeat, either continuously or discontinuously, along the desired travel path 206. In this particular case, the critical points 220 correspond to locations along the center of the seam 108 between the paved portion 102A and unpaved portion 102B of the road-building site 100. However, in other cases, other portions of the same reference point may be used as critical points 220 (e.g., top or bottom edges of the seam). Similarly, in place of a seam 108, other types of real-life reference points could be used and then represented within the model 212 as critical points 220. For example, any of the following types of features could function as a suitable reference point: a normal straight cut edge of a paved area, a painted line at the road-building site 100, a median, a curb, a landscape edge, or any other element that preferably runs along the longitudinal extent of the road-building site.

By plotting a line 222 within the model 212 through these various critical points 220, a desired travel path 206 for road construction machines can be digitally modeled. Line 222 can represent and be disposed along the desired travel path 206 of the machine 200. Alternatively and more preferably, the line 222 can be used, in combination with other data, to determine the actual desired travel path 206 of the machine 200. It is unlikely that all machines 200 would need to travel precisely along the same line 222 and, for that reason, it is more advantageous to derive a desired travel path 206 based on the line 222 rather than using the line, itself, as the travel path. Thus, in preferred embodiments, the MGS 204 includes one or more machine position sensors 224 that are used to sense the current position, orientation or heading, and speed of the machine 200 (or its various components) (collectively, "position data"). By providing this position data to the MGS 204, a desired travel path 206 can be derived. In FIG. 2 for example, the desired travel path 206 may be based on a known relative spacing between a position sensor 224 located on a particular machine 200 and another component of that machine (e.g., screed side plate). This other component may also be provided with a position sensor, the component requiring a specific location relative to the road-building site 100 (e.g., at the seam) to function optimally. The known relative spacing of the sensors and the components is then combined with a desired offset between the line 222 and the sensors to maintain the desired location of the machine component.

In order to identify the precise position of the critical points 220 within the model 212, each of the scans 214 that form the model 212 are preferably analyzed by one or more computer-based processing units 226 (shown in FIG. 2) associated with the MGS 204. As with most sets of data, certain data analysis techniques or data conditioning may be required or desirable in order to obtain a higher quality data set. Thus, when identifying the position of critical points 220 in the model 212, the processing units 226 may apply certain filters in order to remove noise or outliers 220' in the data set. In this case, the outliers 220' are locations within the model 212 that were previously mis-identified as having a location that corresponds with the location of the reference point (i.e., the seam 108). Other data filtering may be necessary or desired in order tailor the data to obtain a more ideal data set. For example, it might be necessary to remove or limit the number of critical points 220 identified in order to speed up processing of the data and the generation of line 222.

The line 222, itself, is preferably plotted based on a curve that best fits or that connects the plurality of critical points. Any predictive analytical methods may be used to fit the line 222 to the data. For example, in certain embodiments, linear regression is used to fit a curve to the critical points. This line 222 may, of course, be updated as the MGS 204 is provided with updated information. For example, in preferred embodiments, as the machine 200 continues to gather data via the sensors 210 as it travels along the road-building site 100 and to provide that data to the MGS 204. As that data is gathered and provided to the MGS 204, the line 222 and desired travel path 206 are updated. Preferably, this happens in real time and continuously or semi-continuously. For example, in certain preferred embodiments, the desired travel path 206 is updated at least 10 times per second.

Preferably, the above-described data collection and data manipulation and the generation of the line is carried out partially or entirely automatically and programmatically by the MGS 204. For example, for certain commonly occurring structures or features at road-building sites 100 often used in the creation of a desired path or line 222 for road construction machines 200, computer-based "profiles" are created that automate the creation process of that desired path or one or more portions of that creation process. This automation process might include certain steps used in collecting data (e.g., identifying appropriate points of reference), improving the data (e.g., filtering outliers 220') and manipulating data (e.g., fitting a line 222 to the data). The profiles may employ a variety of algorithms to optimize performance in the manner discussed above. In certain preferred implementations, artificial intelligence, such as trained machine learning algorithms and neural networks, is used in one or more of these automated processes.

Figure 4:
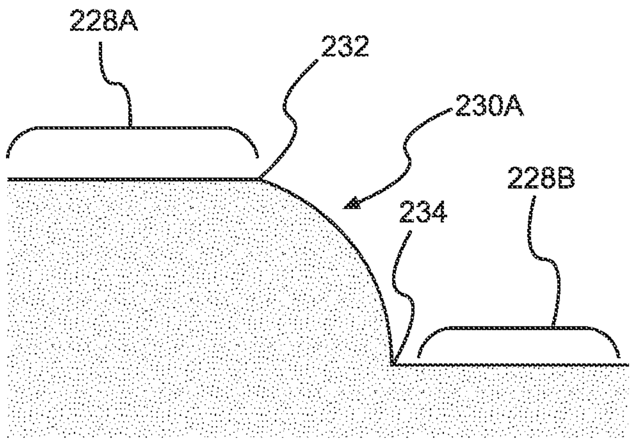
FIGS. 4-6 depicts three profiles that may be used by the MGS in simplifying and improving the creation of a 3-D model used for guiding road construction machines along a desired travel path at a road-building site.
Figure 5:
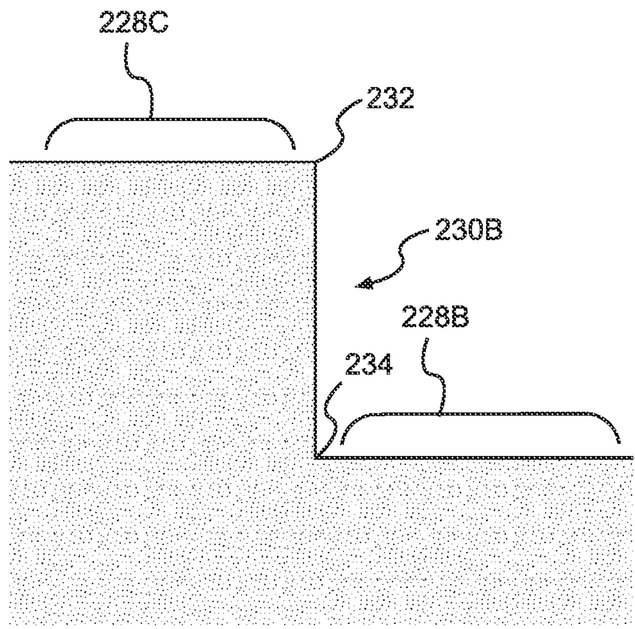
Figure 6:
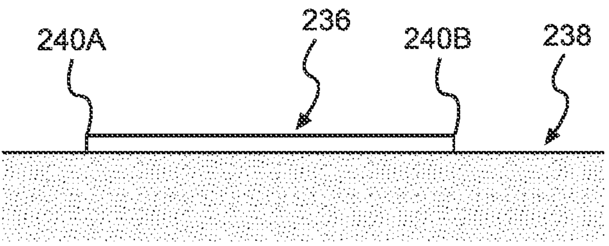

With continued reference to FIG. 3 and with further reference to FIGS. 4-6, three examples of commonly occurring structures or features that are often found at road-building sites 100 are illustrated. In FIG. 4, a site condition is presented that is similar to that shown in FIG. 1, where a partially-completed road surface is shown including a paved portion 228A abutting an unpaved portion 228B along a longitudinal joint or seam 230A. The seam 230A is somewhat gradual or curved and has a top portion 232 that is located at the same elevation as the top of the paved portion 228A and a bottom portion 234 that is located at the same elevation as the top of the unpaved portion 228B. A smooth, non-vertical transition is provided between the top portion 232 and the bottom portion 234 of the seam 230A. The transition between the paved portion 228A and the top portion 232 of the seam 230A is smooth or gradual, whereas the transition between the bottom portion 234 of the seam and the unpaved portion 228B is abrupt. In FIG. 5, a straight cut edge situation is shown, where a partially-completed road surface is shown that includes a paved or raised portion 228C abutting the unpaved portion 228B along a longitudinal joint or seam 230B. The seam 230B includes a top portion 232 and a bottom portion 234. However, a primary difference between this straight cut edge scenario and the prior scenario shown in FIG. 4 is that, for straight cut edges, the transitions between both the paved portion 228A and the top portion 232 of the seam 230B and the bottom portion 234 of the seam and the unpaved portion 228B are abrupt (i.e., sharp and not gradual). In each of these cases, there is an appreciable difference in elevation between the top and bottom portions 232, 234 of the seams 230A, 230B. On the other hand, the structure shown in FIG. 6 is fairly different from those shown in FIG. 4 or 5. In FIG. 6, a painted line 236 is shown on top of a paved surface 238 and where the vertical thickness of the painted line 236 is exaggerated. The difference in height when comparing the seams 230A, 230B shown above and this paint line 236 might be one way to distinguish the structures. Identifiable features that are unique to the scenario shown in FIG. 6 might include the width of the painted line 236 between its left end 240A and right end 240B, which should remain consistent and be easily identified. Another potentially identifiable feature is the difference in color between the lighted-colored painted line 236 and the darker-colored paved surface 238.

Figure 7:
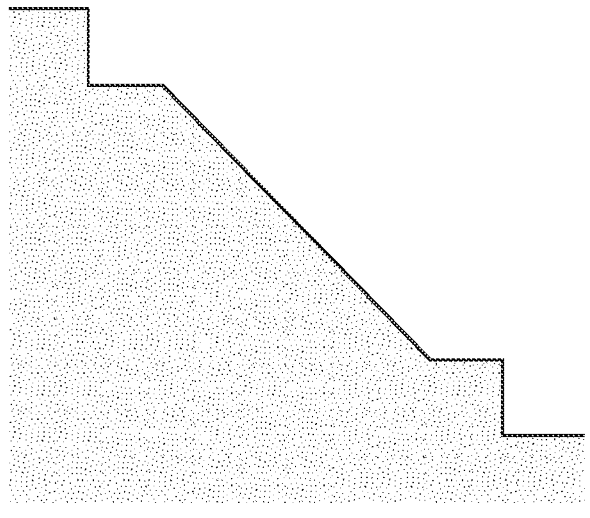
FIGS. 7 and 8 depict conventional safety or shovel edges that are sometimes located along a roadway and that are preferably capable of being detected and analyzed automatically by the MSG.
Figure 8:
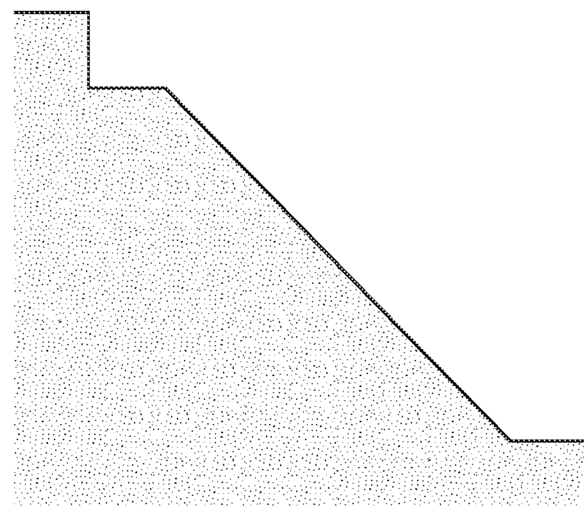

Preferably, in each of the above-described situations, the MGS 204 may be configured or programmed to identify or account for these common features when scanning that particular type of structure. This might be done, for example, following an initial scan of the road-building site 100 by the sensors 210 of the machine 200. Advantageously, this would allow for the processing of the data collected on by the MGS to be faster, more consistent, and more accurate. In other words, because the MGS 204 knows what features should be present for a given structure, those features can be identified more readily. In certain implementations of the invention, the MGS 204 is able to identify these structures or features itself upon scanning them, such as through a trained machine learning algorithm. In other cases, an operator or user may select one of multiple selectable preprogrammed edge profiles that identify the relevant structure or feature in order to modify the behavior of the MGS 204. The above three scenarios are merely examples of structures or features that commonly occur at road-building sites that could be programmed into the MGS 204. It may be appreciated that many other and different structures and features could also be identified and the MGS 204 may be programmed to account for those other structures as well. For example, in FIGS. 7 and 8, examples of conventional longitudinal boundary conditions, sometimes called safety or shovel edges, are illustrated. These kind of angled edges are commonly found along edges of roadways to avoid sharp drops, which can assist in preventing car crashes and assist drivers to re-enter the paved road more safely. Preferred implementations of the present invention are capable of detecting and accounting for these kinds of safety edges.

Figure 9:
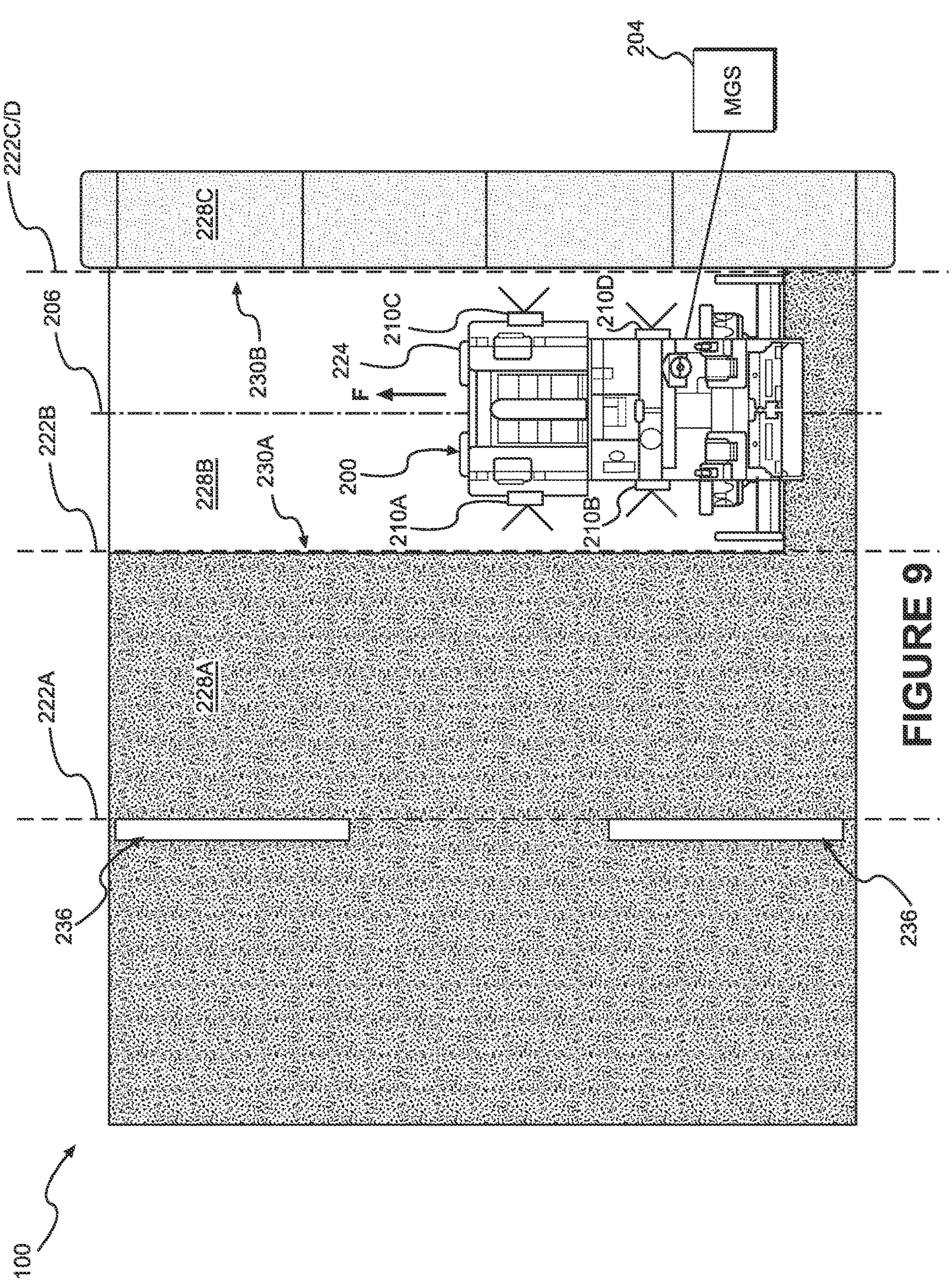
FIG. 9 is an overhead view of a road construction machine being guided along a desired travel path between two boundaries by a machine guidance system according to an alternative implementation of the present invention.

Finally, FIG. 9 provides an overhead view depicting a road construction machine 200 having or in communication with a machine guidance system 204 according to an implementation of the present invention. Machine 200 is located at a road-building site 100 that features all three of the preprogrammed structures shown in FIGS. 4-6 and discussed above. More particularly, this building site 100 includes a paved 2-lane raised portion 228A having intermittent painted white lines 236 (as seen in FIG. 6), an unpaved portion 228B, a raised sidewalk portion 228C, a gradual seam 230A (as seen in FIG. 4) located on the left side of the machine, and a straight seam 230B (as seen in FIG. 5) located on the right side of the machine. Two laser-based sensors 210A, 210B are located on the left side of the machine 200 and two more sensors 210C, 210D are located on the right side of the machine.

Each of the sensors 210A-210D is configured to scan a portion of the road-building site 100 in order to collect data and, preferably, to produce a corresponding line (See Ref. Nos. 222A-222D) that may be used in the creation and verification or improved accuracy of a desired travel path 206. In particular, sensor 210A may be used to scan the intermittent painted white lines 236. Those scans may then be combined with other information, such as the location of and spacing between components of the MGS 204 (e.g., sensor 210A and a machine position sensor), to create line 222A within a 3-D model of the road-building site 100 according to the methods discussed above. At the same time, sensor 210B may also be used to scan the gradual seam 230A, which may then be used by MGS 204 to create line 222B. Lastly, sensors 210C and 210D may each be used to scan the straight seam 230B independently of one another, which may then be used by MGS 204 to create lines 222C and 222D, respectively. Then, based on these lines 222A-222D, a desired travel path 206 may be generated. Each of the independently-created lines 222A-222D may be used to independently determine a separate travel path 206. Those separate travel paths 206 may then be compared to one another for error checking purposes, averaged together, etc. Preferably, this process is repeated continuously or semi-continuously such that the travel path 206 is updated in real time.

Finally, the machine guidance system 204 may be configured to provide instructions to an operator that instructs them on how to modify the current position, heading and speed of the machine 200 so as to conform to the desired travel path 206. An operator then uses these instructions to adjust the current positon of the road construction machine 200. Alternatively, the road construction machine 200 can include a controller for receiving the instructions from the machine guidance system 204 and automatically adjusting the needed characteristic of the road construction machine 200 to align the current position with the desired travel path 206, i.e., steering or speed, upon receipt.

As noted previously, the desired travel path 206 is similar to a flight plan used in the air travel industry. In certain embodiments, the MGS 204 provides instructions for aligning the current position with the desired travel path 206. These instructions (e.g., "steer left" or "slow down") could be provided to the operator via a display on the machine 200. Based on those instructions, the operator could adjust the current position, heading, and speed of the road construction machine 104 in order to conform with the desired travel path 206. However, in preferred embodiments, the machine guidance system 204 includes an "auto pilot" feature capable of controlling the operation (e.g., position, heading, speed, and other machine functions such as whether a paint sprayer on the machine is turned off or on) of the machine 200 such that the machine stays on the desired travel path 106.

This description of the preferred implementations of the invention is intended to be read in connection with the accompanying drawings, which are to be considered part of the entire written description of this invention. The drawings are not necessarily to scale, and certain features of the invention may be shown exaggerated in scale or in somewhat schematic form in the interest of clarity and conciseness.

What is claimed is:

1. A method for guiding a road construction machine along a desired travel path at a road-building site, the method comprising:

providing said road construction machine;

providing a machine guidance system (MGS) configured to provide instructions for aligning a current position of the road construction machine with the desired travel path at the road-building site in order to guide the road construction machine along the desired travel path, the MGS having:

one or more machine position sensors for determining the current position of the road construction machine;

one or more laser-based sensors that are each configured to capture a plurality of scans of a longitudinal boundary condition of a road surface along a longitudinal extent of the road surface; and one or more processing units configured to:

identify at least one critical point in each of the plurality of scans that is estimated to correlate with a location of a reference point of the road surface, generate a digital desired travel path of the road construction machine based on the at least one critical point of at least two of the plurality of scans; and provide instructions for aligning the current position of the road construction machine with the desired travel path of the road construction machine, and with the one or more machine position sensors, capturing the plurality of scans of the road surface at the road-building site, wherein the road surface has reference points disposed along the longitudinal extent of the road surface;

providing the plurality of scans to the one or more processing units of the MGS;

for each of the plurality of scans, identifying the at least one critical point using the one or more processing units;

with the one or more processing units, generating the digital desired travel path based on the at least one critical point of the at least two of the plurality of scans;

with the one or more machine position sensors, determining the current position of the road construction machine; and with the one or more processing units, providing instructions for aligning the current position with the desired travel path.

2. The method of claim 1 wherein the reference points are discontinuous along the longitudinal extent of the road surface such that a discontinuity exists between a first critical point of at least a first one of the plurality of scans and a second critical point of a second one of the plurality of scans that is immediately adjacent the first one of the plurality of scans.

3. The method of claim 1 wherein the one or more processing units includes at least two preprogrammed edge profiles, wherein each of the at least two preprogrammed edge profiles corresponds to a different type of road-building site and includes a set of instructions for processing the plurality of scans of the road surface to identify the at least one critical point associated with the corresponding type of road-building site, the method further comprising the step of selecting one of the at least two preprogrammed edge profiles and identifying the at least one critical point based on the selected one of the at least two preprogrammed edge profiles.

4. The method of claim 3 wherein the MGS is configured to automatically select one of the at least two preprogrammed edge profiles in response to an initial scan of the road surface, the method further comprising the step of using the one or more laser-based sensors to conduct an initial scan of the road surface such that, in response to the initial scan, the MGS automatically selects one of the at least two preprogrammed edge profiles.

5. The method of claim 3 wherein the at least two preprogrammed edge profiles of the MGS utilize artificial intelligence in identifying the at least one critical point, generating the digital desired travel path based on the at least one critical point identified, determining the current position of the road construction machine, or providing instructions for aligning the current position of the road construction machine with the desired travel path.

6. The method of claim 1 further comprising the step of using the one or more processing units to selectively utilize only a portion of the at least one critical points when generating the digital desired travel path.

7. The method of claim 1 wherein the digital desired travel path and the instructions are updated in real-time as the road construction machine travels along the road surface.

8. The method of claim 1 further comprising the steps of:
with a first sub-set of the one or more laser-based sensors, capturing a first plurality of scans of the road surface along a first longitudinal extent of the road surface along a first lateral side of the road construction machine;
with a second sub-set of the one or more laser-based sensors, capturing a second plurality of scans of the road surface along a second longitudinal extent of the road surface along a second lateral side of the road construction machine;
for each of the first plurality of scans, identifying a first critical point using the one or more processing units;
for each of the second plurality of scans, identifying a second critical point using the one or more processing units; and
generating the digital desired travel path based on the first critical point and the second critical point identified.

9. The method of claim 1 further comprising the steps of:
with a first sub-set of the one or more laser-based sensors, capturing a first plurality of scans of the road surface along a longitudinal extent of the road surface along a first lateral side of the road construction machine;
with a second sub-set of the one or more laser-based sensors, capturing a second plurality of scans of the road surface along the longitudinal extent of the road surface along the first lateral side of the road construction machine;
for each of the first plurality of scans, identifying a first critical point using the one or more processing units;
for each of the second plurality of scans, identifying a second critical point using the one or more processing units; and
generating the digital desired travel path based on the first critical point and the second critical point identified.

10. The method of claim 9 wherein each of the second critical points is different from each of the first critical points.

11. A machine guidance system (MGS) configured to provide instructions for aligning a current position of a road construction machine with a desired travel path at a road-building site in order to guide the road construction machine along the desired travel path, the MGS comprising:
one or more machine position sensors for determining the current position of the road construction machine;
one or more laser-based sensors that are each configured to capture a plurality of scans of a longitudinal boundary condition of a road surface along a longitudinal extent of the road surface; and
one or more processing units configured to:
identify at least one critical point in each of the plurality of scans that is estimated to correlate with a location of a reference point of the road surface;
generate a digital desired travel path of the road construction machine based on the at least one critical point of at least two of the plurality of scans; and
provide instructions for aligning the current position of the road construction machine with the desired travel path of the road construction machine.

12. The MGS of claim 11 wherein the one or more machine position sensors are further configured to determine at least one of a current heading or a current speed of the road construction machine.

13. The MGS of claim 11 wherein the one or more processing units are further configured to generate a line that is fitted to the at least one critical point of at least two of the plurality of scans identified and wherein the desired travel path is generated based on the line and wherein the desired travel path and the instructions for aligning the current position of the road construction machine with the desired travel path are based on at least one parameter related to the road construction machine, wherein the at least one parameter is selected from a group consisting of: a geometry of the road construction machine or a component or portion thereof, a current speed of the road construction machine, and a current heading of the road construction machine.

14. The MGS of claim 13 wherein the one or more processing units is configured to generate the line based on a curve best approximating a theoretical line connecting the at least one critical point of at least two of the plurality of scans.

15. The MGS of claim 11 wherein the one or more processing units are further configured to automatically execute the instructions so as to automatically align the road construction machine with the desired travel path including by automatically steering the road construction machine.

16. The MGS of claim 11 wherein the one or more processing units include a selection of at least two preprogrammed edge profiles, wherein each of the at least two preprogrammed edge profiles corresponds to a different type of road-building site and includes a set of instructions for processing the plurality of scans of the road surface to identify at least one critical point in each of the plurality of scans associated with the corresponding type of road-building site.

17. The MGS of claim 16 wherein the MGS is configured to automatically select one of the at least two preprogrammed edge profiles in response to an initial scan of the road surface.

18. The MGS of claim 11 wherein the at least one processing unit is configured to generate a representative model of the road surface that includes a desired function path for performing a desired machine function relative to the road surface and, upon generation of the representative model, to provide instructions for positioning the road construction machine such that the desired machine function may be performed along the desired function path.

19. The MGS of claim 11 further comprising a controller configured to receive the instructions for aligning the current position of the road construction machine with the desired travel path of the road construction machine and to automatically adjust the position of the road construction machine via an automatic steering control device, such that the road construction machine travels along the desired travel path.

20. The MGS of claim 11 wherein the MGS is disposed exclusively on the road construction machine.

* * * * *